United States Patent [19]
Cordier et al.

[11] Patent Number: 5,486,983
[45] Date of Patent: Jan. 23, 1996

[54] LIGHTING MODULE FOR INSTRUMENTS WITH A LIQUID-CRYSTAL MATRIX

[75] Inventors: Maurice Cordier, Paris; Bernard Veislinger, Parmain, both of France

[73] Assignee: Sextant Avionique, France

[21] Appl. No.: 307,370

[22] Filed: Sep. 16, 1994

[30] Foreign Application Priority Data

Sep. 21, 1993 [FR] France ................... 93 11208

[51] Int. Cl.[6] ............................... G02F 1/1335
[52] U.S. Cl. .................. 362/29; 362/260; 362/247; 362/346; 359/50
[58] Field of Search .............. 362/29, 260, 241, 362/247, 225, 297, 346, 347, 330; 359/50

[56] References Cited

U.S. PATENT DOCUMENTS

| | | | |
|---|---|---|---|
| 4,425,604 | 1/1984 | Imai et al. | |
| 5,143,433 | 9/1992 | Farrell | 362/29 |
| 5,253,151 | 10/1993 | Mepham et al. | 362/347 |

FOREIGN PATENT DOCUMENTS

| | | |
|---|---|---|
| 0374085 | 6/1990 | European Pat. Off. |
| 0420072 | 4/1991 | European Pat. Off. |

OTHER PUBLICATIONS

Patent Abstracts of Japan, vol. 12, No. 102, p. 684, Apr. 5, 1988 & JP-A-62 234 126 (NEC Home Electronics Ltd.) 14 Oct. 1987, abstract.

Primary Examiner—Ira S. Lazarus
Assistant Examiner—Sara Sachie Raab
Attorney, Agent, or Firm—Rosenman & Colin

[57] ABSTRACT

A lighting module for instruments with a liquid-crystal matrix (1) is disclosed. The module has a casing (5) including a back (8) and lateral walls (7), the said matrix closing off the casing on its face opposite the back, and at least one fluorescent tube (9). The fluorescent tube is disposed in the casing near the back. The back is reflective and shaped to form at least one parabolic cylindrical surface. The axis of the said fluorescent tube is substantially merged with the focal line of the said surface.

3 Claims, 1 Drawing Sheet

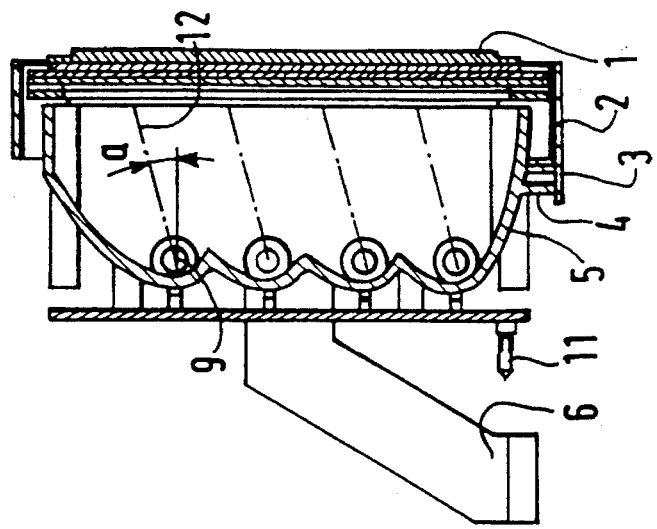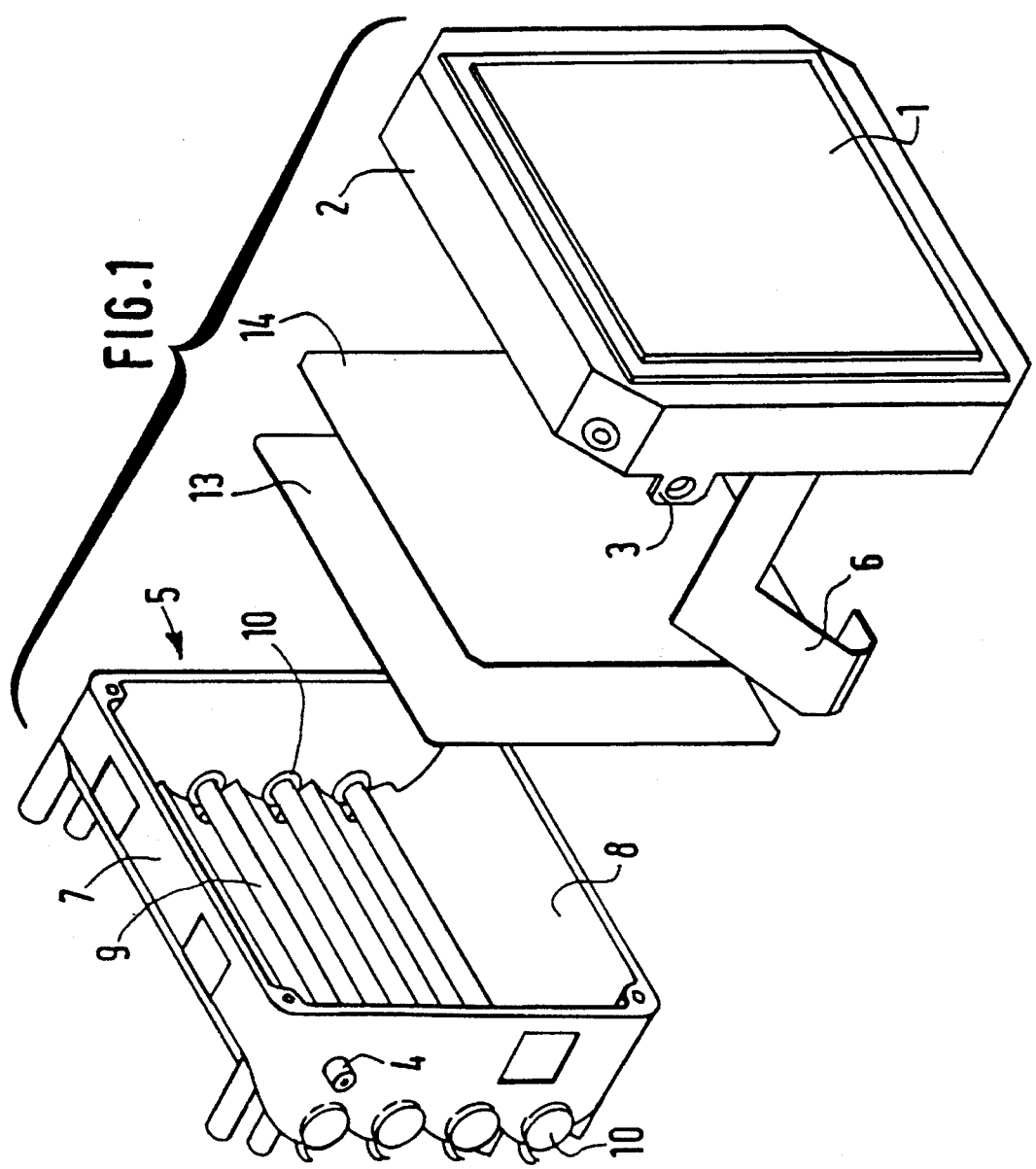

LIGHTING MODULE FOR INSTRUMENTS WITH A LIQUID-CRYSTAL MATRIX

BACKGROUND OF THE INVENTION

1. Field of the Invention

The present invention concerns a lighting module for instruments with a liquid-crystal matrix. More particularly, it concerns a module comprising a casing including a back and lateral walls, the said matrix closing off the casing on its face opposite the back, and at least one fluorescent tube being disposed in the casing near the back.

2. Discussion of Related Art

The illumination of active or inactive liquid crystal matrix screens is generally provided by one or more fluorescent tubes with cold or hot cathodes according to the applications and the levels of luminance required. One of the drawbacks of these lighting devices lies in the power which they require, whilst one of the main advantages of active-matrix screens is precisely their very low consumption. This problem becomes crucial when these screens are used in instruments on the instrument panel of an aircraft where the light environments may reach very high levels. The power expended in the instruments to generate the level of light ensuring legibility of the screen under these conditions has an adverse effect on the reliability of the equipment.

Until now, the backs of the casings of known lighting modules were flat and white. Such an arrangement, however, has the drawback that a large part of the light is emitted in directions in which it is of no use, which is particularly the case in applications concerning an instrument panel, where the person required to take note of the information displayed by the instrument is sitting in a specific, precise position with respect to the screen.

The present invention aims to mitigate this drawback.

SUMMARY OF THE INVENTION

To this effect, the object of the invention is a lighting module for instruments with a liquid-crystal matrix comprising a casing having a back and lateral walls, the said matrix closing off the casing on its face opposite the back, and at least one fluorescent tube being disposed in the casing in the vicinity of the back, characterised by the fact that the said back is reflective and shaped to form at least one parabolic cylindrical surface, the axis of the said fluorescent tube being substantially merged with the focal line of the said surface.

The effect of such an arrangement is to collimate the light coming from the fluorescent tubes in the desired direction. This results in reduced light losses and, consequently, at a given level of illumination, less power required than in known lighting modules.

In order for the light given out to be as homogenous as possible in the desired direction, provision can be made to shape the back as a plurality of parabolic cylindrical surfaces, the focal lines of which are parallel.

In addition, because in a vertical plane the instruments are viewed at a positive angle, provision is preferably made to incline the symmetry planes of the parabolic cylindrical surfaces with respect to the plane of the liquid-crystal matrix, so that the majority of the light is directed upwards.

BRIEF DESCRIPTION OF THE DRAWING

A particular embodiment of the invention will now be described by way of non-limiting example, with reference to the accompanying drawings in which:

FIG. 1 is an exploded perspective view of a screen having a lighting module according to the invention, and FIG. 2 is a cross section view of this screen.

DETAILED DESCRIPTION OF A PREFERRED EMBODIMENT

The screen shown in the drawings comprises a liquid-crystal matrix 1 mounted in a supporting frame 2. The frame 2 has mounting means 3 cooperating with equivalent means 4 on a casing 5 which will be described below, as well as fixing arms 6 to fix the screen to an instrument panel.

The casing 5 has lateral walls 7 and a back wall 8 and is closed off by the liquid-crystal matrix 1 on the opposite side from the back 8. The casing 5 may consist of a piece of moulded aluminium coated by sublimation on the inside of the casing 5.

The back 8 here consists of four parabolic cylindrical surfaces, the focal lines of which, that is to say the straight lines formed from the foci of the cross sections of the back, are parallel to each other and horizontal when the screen is mounted. In other words, seen in section in a vertical plane perpendicular to the matrix 1, the back 8 forms a series of arcs of a parabola connected together.

Four fluorescent tubes 9 are disposed so that their axes coincide with the focal lines of the four parabolic surfaces and are fixed and powered by means of sockets 10 connected by suitable wires to a connector 11.

The symmetry planes 12 of the parabolic cylindrical surfaces are inclined upwards with respect to the plane of the matrix 1 and therefore form an angle a, for example one of around 15° C., with the horizontal. The parabolic cylindrical surfaces are, furthermore, shaped in such a way that the light is essentially emitted in a dihedron of about 20° on each side of the plane 12.

Finally, a filter 13 and a diffuser 14 are provided between the casing 5 and the liquid-crystal matrix 1. The diffuser 14 receives, on the one hand, the Lambertian flux coming directly from the tubes 9 and, on the other hand, the reflected collimated flux coming from the parabolic cylindrical surfaces. That is to say, both flux providing luminance on the screen that is inversely proportional to the square of the distance fromthe source of the flux, and collimated flux. The diffuser 14 is therefore disposed at a distance from the back 8 of the casing 5 such that the illumination resulting from the sum of these two luminous fluxes is as homogenous as possible.

By concentrating the luminous flux in the direction of the observer, the invention enables the electric power necessary for lighting to be reduced.

I claim:

1. A lighting module for instruments having a liquid-crystal matrix lying in a plane, said module comprising:

a casing including back and lateral walls wherein the matrix forms a wall of the casing opposite said back wall;

a fluorescent tube disposed in the casing near said back wall; and a reflective surface shaped to form at least one parabolic cylindrical surface, said cylindrical surface having a focal line and a plane of symmetry, the axis of said fluorescent tube being substantially coaxial with said focal line and the planes of symmetry of said parabolic cylindrical surfaces being inclined with respect to the plane of the said liquid-crystal matrix.

2. A lighting module according to claim 1, in which the said back wall is shaped to form a plurality of parabolic cylindrical surfaces, said cylindrical surfaces having parallel focal lines.

3. A lighting module for instruments having a liquid-crystal matrix lying in a plane, said module comprising:

a casing including back and lateral walls wherein the matrix forms a wall of the casing opposite said back wall;

a fluorescent tube disposed in the casing near said back wall;

a reflective surface shaped to form at least one parabolic cylindrical surface, said cylindrical surface having a focal line and a plane of symmetry, the axis of said fluorescent tube being substantially coaxial with said focal line, and the planes of symmetry of said parabolic cylindrical surfaces being inclined with respect to the plane of the said liquid-crystal matrix; and a diffuser between said casing and the liquid-crystal matrix at a distance from the back wall of said casing such that the illumination provided by the sum of the Lambertian flux coming directly from the tube and the collimated flux reflected by the parabolic cylindrical surfaces is substantially homogeneous.

* * * * *